United States Patent
Jen et al.

(10) Patent No.: US 11,967,717 B2
(45) Date of Patent: *Apr. 23, 2024

(54) TUNGSTEN-DOPED LITHIUM MANGANESE IRON PHOSPHATE-BASED PARTICULATE AND TUNGSTEN-DOPED LITHIUM MANGANESE IRON PHOSPHATE-BASED POWDERY MATERIAL INCLUDING THE SAME

(71) Applicant: HCM CO., LTD., Taoyuan (TW)

(72) Inventors: Chien-Wen Jen, New Taipei (TW);
Hsin-Ta Huang, Taipei (TW);
Chih-Tsung Hsu, New Taipei (TW);
Yi-Hsuan Wang, New Taipei (TW)

(73) Assignee: HCM CO., LTD., Taoyuan (TW)

( * ) Notice: Subject to any disclaimer, the term of this patent is extended or adjusted under 35 U.S.C. 154(b) by 376 days.

This patent is subject to a terminal disclaimer.

(21) Appl. No.: 17/305,906

(22) Filed: Jul. 16, 2021

(65) Prior Publication Data
US 2021/0344012 A1    Nov. 4, 2021

Related U.S. Application Data

(63) Continuation-in-part of application No. 16/717,180, filed on Dec. 17, 2019, now Pat. No. 11,094,936.

(30) Foreign Application Priority Data

Oct. 16, 2019 (TW) .................. 108137209
Oct. 16, 2019 (TW) .................. 108137210

(51) Int. Cl.
*H01M 4/58* (2010.01)
*C01B 25/45* (2006.01)
*H01M 4/02* (2006.01)
*H01M 10/0525* (2010.01)

(52) U.S. Cl.
CPC .......... *H01M 4/5825* (2013.01); *C01B 25/45* (2013.01); *H01M 10/0525* (2013.01); *C01P 2002/52* (2013.01); *C01P 2002/72* (2013.01); *C01P 2006/12* (2013.01); *C01P 2006/40* (2013.01); *H01M 2004/021* (2013.01); *H01M 2004/028* (2013.01)

(58) Field of Classification Search
CPC ............ H01M 4/364; H01M 4/5825; H01M 10/0525; H01M 2004/028; C01B 25/45
USPC ............ 252/513, 515, 521.2, 521.6; 361/532
See application file for complete search history.

(56) References Cited

U.S. PATENT DOCUMENTS

| | | | |
|---|---|---|---|
| 2012/0032119 A1* | 2/2012 | Tahara | C01B 25/45 |
| | | | 423/306 |
| 2012/0326079 A1 | 12/2012 | Kim et al. | |
| 2013/0140497 A1 | 6/2013 | Nuspl et al. | |
| 2016/0240856 A1 | 8/2016 | Paulsen et al. | |

FOREIGN PATENT DOCUMENTS

| | | |
|---|---|---|
| CN | 106935851 A | 7/2017 |
| EP | 2407422 A1 | 1/2012 |
| JP | 2014524133 A * | 9/2014 |

OTHER PUBLICATIONS

Final Office Action dated Dec. 30, 2020 for U.S. Appl. No. 16/717,180.
Hongfei Liu and Tiekun Jia "Electrochemical Properties of W doped LiFePO4/C Prepared by Solid-state Synthesis", Journal of Ningxia University vol. 32 No. 2, Jun. 2011, pp. 144-146.
Notice of Allowance dated Apr. 14, 2021 for U.S. Appl. No. 16/717,180.
Office Action dated Oct. 1, 2020 for U.S. Appl. No. 16/717,180.
Richard Prabakar S J et al.: "W-doped LiWx Ni0.5 Mn1.5-X O4 cathodes for the improvement of high rate performances in Li ion batteries", Journal of Power Sources 209(2012), pp. 57-64.
Search Report appended to an Office Action, which was issued to Taiwanese counterpart application No. 108137209 by the TIPO on Jun. 4, 2020, with an English translation thereof.
Search Report issued to European counterpart application No. 20150984.1 by the EPO on Apr. 22, 2020.

* cited by examiner

*Primary Examiner* — Tri V Nguyen
(74) *Attorney, Agent, or Firm* — MLO, a professional corp.

(57) ABSTRACT

Disclosed is a tungsten-doped lithium manganese iron phosphate-based particulate for a cathode of a lithium-ion battery. The particulates include a composition represented by a formula of $Li_xMn_{0.998-y-z}Fe_yM_zW_{0.002}P_aO_{4\pm p}/C$, wherein x, y, z, a, p, and M are as defined herein. Also disclosed is a powdery material including the particulates, and a method for preparing the powdery material.

4 Claims, 5 Drawing Sheets

TUNGSTEN-DOPED LITHIUM MANGANESE IRON PHOSPHATE-BASED PARTICULATE AND TUNGSTEN-DOPED LITHIUM MANGANESE IRON PHOSPHATE-BASED POWDERY MATERIAL INCLUDING THE SAME

CROSS-REFERENCE TO RELATED APPLICATION

This application is a continuation-in-part (CIP) application of U.S. patent application Ser. No. 16/717,180 filed on Dec. 17, 2019, which claims priority of Taiwanese Patent Application Nos. 108137209 and 108137210, both of which were filed on Oct. 16, 2019. The entire content of each of the U.S. patent application and Taiwanese patent applications is incorporated herein by reference.

FIELD

The disclosure relates to a tungsten-doped lithium manganese iron phosphate-based particulate, and more particularly to a tungsten-doped lithium manganese iron phosphate-based particulate for a cathode of a lithium-ion battery. The disclosure also relates to a tungsten-doped lithium manganese iron phosphate-based powdery material including the particulate, and a method for preparing the powdery material.

BACKGROUND

Lithium-ion battery is commonly used as an energy saving device and a power supplying device for consumer electronic products, transportation facilities, etc. Conventional lithium manganese iron phosphate suitably used as a cathode of the lithium-ion battery has inferior electric conductivity, and thus is usually doped with a metal element without electrochemical activity so as to enhance the electric conductivity thereof.

However, the doped lithium manganese iron phosphate usually has a relatively low electric capacity, compared to undoped lithium manganese iron phosphate. Therefore, the energy density of the lithium-ion battery thus made is undesirably reduced. In addition, the doped lithium manganese iron phosphate usually has a relatively large specific surface area, compared to the undoped lithium manganese iron phosphate, and thus is liable to absorb moisture. Therefore, a cathode material containing the doped lithium manganese iron phosphate is difficult to be dispersed, resulting in increased production cost for an electrode made therefrom, which is one of the reasons why the lithium-ion battery that uses the doped lithium manganese iron phosphate as a cathode material remains to be commercialized.

SUMMARY

Therefore, a first object of the disclosure is to provide a tungsten-doped lithium manganese iron phosphate-based particulate for a cathode of a lithium-ion battery to overcome the shortcomings described above.

A second object of the disclosure is to provide a tungsten-doped lithium manganese iron phosphate-based powdery material, which includes the tungsten-doped lithium manganese iron phosphate-based particulate, for a cathode of a lithium-ion battery.

According to a first aspect of the disclosure, there is provided a tungsten-doped lithium manganese iron phosphate-based particulate for a cathode of a lithium-ion battery. The tungsten-doped lithium manganese iron phosphate-based particulate includes a composition represented by the following formula:

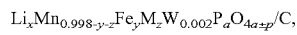

$Li_xMn_{0.998-y-z}Fe_yM_zW_{0.002}P_aO_{4\pm p}/C$, wherein
M is a metal combination that includes Mg and Ti;
$0.9 \leq x \leq 1.2$;
$0.1 \leq y \leq 0.4$;
$0 \leq z \leq 0.08$;
$0.098 < y+z < 0.498$;
$0.85 \leq a \leq 1.15$;
$0 < p < 0.1$; and
C is in an amount of larger than 0 wt % and up to 3.0 wt % based on a total weight of the composition.

According to a second aspect of the disclosure, there is provided a tungsten-doped lithium manganese iron phosphate-based powdery material for a cathode of a lithium-ion battery. The tungsten-doped lithium manganese iron phosphate-based powdery material includes the aforesaid tungsten-doped lithium manganese iron phosphate-based particulate.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
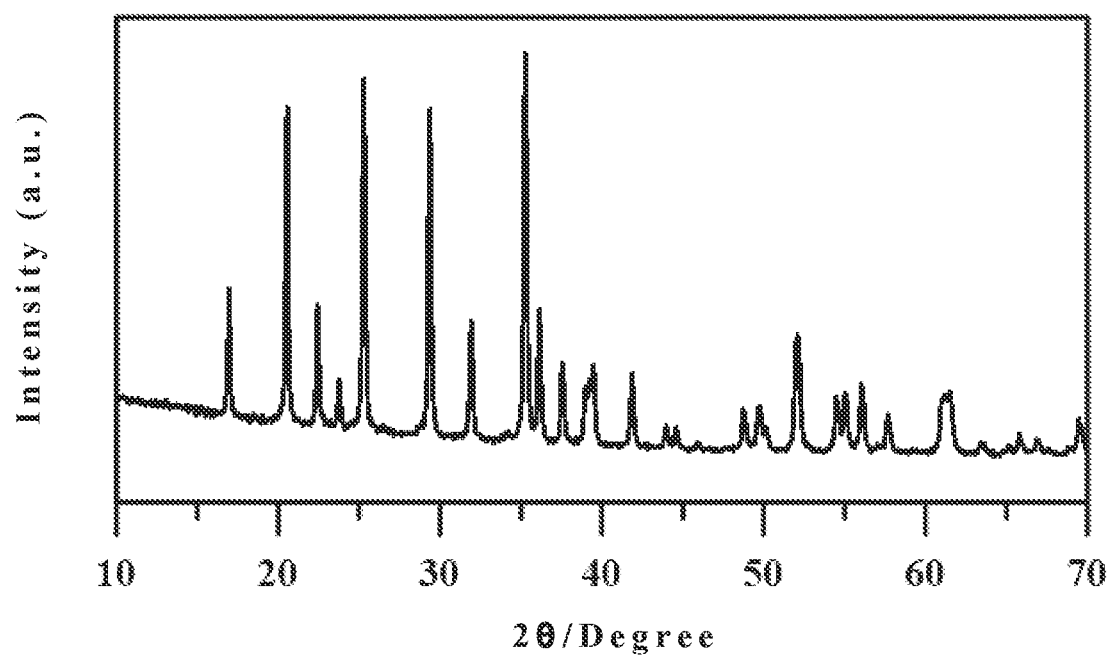
FIG. 1 is a graph illustrating x-ray diffraction analysis result of a tungsten-doped lithium manganese iron phosphate-based particulate of Example 1.

A tungsten-doped lithium manganese iron phosphate-based particulate for a cathode of a lithium-ion battery according to the disclosure includes a composition represented by Formula (1):

$Li_xMn_{1-y-z}Fe_yM_zW_fP_aO_{4\pm p}/C$     (1)

wherein
M is selected from the group consisting of Mg, Ca, Sr, Al, Si, Ti, Cr, V, Co, Ni, Zn, and combinations thereof;
$0.9 \leq x \leq 1.2$;
$0.1 \leq y \leq 0.4$;
$0 \leq z \leq 0.08$;
$0 < f < 0.02$;
$0.1 < y-z+f < 0.5$;
$0.85 \leq a \leq 1.15$;
$0 < p < 0.1$; and
C (i.e., carbon) is in an amount of larger than 0 wt % and up to 3.0 wt % based on a total weight of the composition represented by Formula (1).

In certain embodiments, M is Mg (i.e., magnesium).

In certain embodiments, f is larger than 0 and less than 0.01 (i.e., 0<f<0.01).

In certain embodiments, the composition of the tungsten-doped lithium manganese iron phosphate-based particulate according to the disclosure is represented by the following formula:

$$Li_xMn_{0.998-y-z}Fe_yM_zW_{0.002}P_aO_{4\pm p}/C$$

wherein

M is a metal combination that includes Mg and Ti; and f is 0.002.

A tungsten-doped lithium manganese iron phosphate-based powdery material for a cathode of a lithium-ion battery according to the disclosure includes the tungsten-doped lithium manganese iron phosphate-based particulate described above.

In certain embodiments, the tungsten-doped lithium manganese iron phosphate-based powdery material has a specific surface area ranging from 0.5 m²/g to 20 m²/g.

A method for preparing the tungsten-doped lithium manganese iron phosphate-based powdery material according to the disclosure includes the steps of:

a) preparing a blend which includes a lithium source, a manganese source, a tungsten source, an iron source, a phosphorous source, and a source of an additional metal selected from the group consisting of Mg, Ca, Sr, Al, Si, Ti, Cr, V, Co, Ni, Zn, and combinations thereof;

b) adding a carbon source to the blend to form a mixture and subjecting the mixture to milling and granulating to form a granulated mixture; and c) subjecting the granulated mixture to a sintering treatment to form the tungsten-doped lithium manganese iron phosphate-based powdery material.

In certain embodiments, the tungsten source used in step a) is tungsten trioxide.

In certain embodiments, the source of the additional metal used in step a) is a magnesium-containing compound (i.e., the additional metal is Mg). In the examples illustrated below, the source of the additional metal used is step a) is magnesium oxide.

The blend may include a plurality of the sources of the additional metal. In certain embodiments, the blend may include a magnesium-containing compound (i.e., the additional metal is Mg) and a titanium-containing compound (i.e., the additional metal is Ti). In certain embodiments, the blend may include a magnesium-containing compound (i.e., the additional metal is Mg), a titanium-containing compound (i.e., the additional metal is Ti), and a cobalt-containing compound (i.e., the additional metal is Co). The magnesium-containing compound may be, e.g., magnesium oxide. The titanium-containing compound may be, e.g., titanium dioxide. The cobalt-containing compound may be, e.g., cobalt hydroxide.

In certain embodiments, the sintering treatment in step c) is implemented at a temperature ranging from 400° C. to 950° C.

Examples of the disclosure will be described hereinafter. It is to be understood that these examples are exemplary and explanatory and should not be construed as a limitation to the disclosure.

EXAMPLE 1: PREPARATION OF A POWDERY MATERIAL INCLUDING TUNGSTEN-DOPED LITHIUM MANGANESE IRON PHOSPHATE-BASED PARTICULATES OF $$Li_{1.05}Mn_{0.668}Fe_{0.277}Mg_{0.032}Ti_{0.021}W_{0.002}PO_{4\pm p}/C\ (P_{E1})$$

Manganese carbonate (a source of manganese (Mn)), iron (II) oxalate (a source of iron (Fe)), magnesium oxide (a source of magnesium (Mg)), titanium dioxide (a source of titanium (Ti)), tungsten trioxide (a source of tungsten (W)), and phosphoric acid (a source of phosphorus (P)) in a molar ratio of Mn:Fe:Mg:Ti:W:P of 0.666:0.277:0.032:0.021:0.002:1.000 were added sequentially into a reactor, and were stirred with water for 1.5 hours, followed by blending with lithium hydroxide (a source of lithium, a molar ratio of Li:P is 1.05:1.00) to obtain a blend. Thereafter, the blend was mixed with a combination or citric acid and glucose (a source of carbon, a molar ratio of C:P is 0.1:1.00) to obtain a mixture. The mixture was ground in a ball mill for 2 hours, and was then granulated and dried using a spray granulator to obtain a granulated mixture. The granulated mixture was subjected to a sintering treatment under a nitrogen atmosphere at 450° C. for 3 hours and then at 650° C. for 5 hours to obtain a target powdery material including tungsten-doped lithium manganese iron phosphate-based particulates of $Li_{1.05}Mn_{0.668}Fe_{0.277}Mg_{0.032}Ti_{0.021}W_{0.002}PO_{4\pm p}/C$ ($P_{E1}$). An amount of carbon in the tungsten-doped lithium manganese iron phosphate-based particulates is 1.66 wt % based on a total weight of the tungsten-doped lithium manganese iron phosphate-based particulates.

EXAMPLE 2: PREPARATION OF A POWDERY MATERIAL INCLUDING TUNGSTEN-DOPED LITHIUM MANGANESE IRON PHOSPHATE-BASED PARTICULATES OF $$Li_{1.05}Mn_{0.668}Fe_{0.277}Mg_{0.032}Ti_{0.018}Co_{0.003}W_{0.002}PO_{4\pm p}/C\ (P_{E2})$$

Manganese carbonate (a source of manganese (Mn)), iron(II) oxalate (a source of iron (Fe)), magnesium oxide (a source of magnesium (Mg)), titanium dioxide (a source of titanium (Ti)), cobalt(II) hydroxide (a source of cobalt (Co)), tungsten trioxide (a source of tungsten (W)), and phosphoric acid (a source of phosphorus (P)) in a molar ratio of Mn:Fe:Mg:Ti:Co:W:P of 0.668:0.277:0.032:0.018:0.003:0.002:1.000 were added sequentially into a reactor, and were stirred with water for 1.5 hours, followed by blending with lithium hydroxide (a source of lithium, a molar ratio of Li:P is 1.05:1.00) to obtain a blend. Thereafter, the blend was mixed with a combination of citric acid and glucose (a source of carbon, a molar ratio of C:P is 0.1:1.00) to obtain a mixture. The mixture was ground in a ball mill for 2 hours, and was then granulated and dried using a spray granulator to obtain a granulated mixture. The granulated mixture was subjected to a sintering treatment under a nitrogen atmosphere at 450° C. for 3 hours and then at 650° C. for 5 hours to obtain a target powdery material including tungsten-doped lithium manganese iron phosphate-based particulates of $Li_{1.05}Mn_{0.668}Fe_{0.277}M_{0.032}Ti_{0.018}Co_{0.003}W_{0.002}PO_{4\pm p}/C$ ($P_{E2}$). An amount of carbon in the tungsten-doped lithium manganese iron phosphate-based particulates is 1.66 wt % based on a total weight of the tungsten-doped lithium manganese iron phosphate-based particulates.

Comparative Example 1

Preparation of a Powdery Material Including Tungsten-Doped Lithium Manganese Iron Phosphate-Based Particulates of $$Li_{1.05}Mn_{0.668}Fe_{0.277}Mg_{0.032}Ti_{0.023}PO_{4\pm p}/C\ (P_{CE1})$$

Procedures of Comparative Example 1 were similar to those of Example 1 except that titanium dioxide, tungsten trioxide, and phosphoric acid were used in a molar ratio of Ti:W:P of 0.023:0:1.000 in Comparative Example 1.

Comparative Example 2

Preparation of a Powdery Material Including Tungsten-Doped Lithium Manganese Iron Phosphate-Based Particulates of

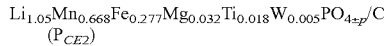
($P_{CE2}$)

Procedures of Comparative Example 2 were similar to those of Example 3 except that titanium dioxide, tungsten trioxide, and phosphoric acid were used in a molar ratio of Ti:W:P of 0.018:0.005:1.000 in Comparative Example 2.

Comparative Example 3

Preparation of a Powdery Material Including Tungsten-Doped Lithium Manganese Iron Phosphate-Based Particulates of

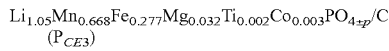
($P_{CE3}$)

Procedures of Comparative Example 3 wore similar to those of Example 2 except that titanium dioxide, cobalt (II) hydroxide, tungsten trioxide, and phosphoric acid were used in a molar ratio of Ti:Co:W:P of 0.02:0.003:0:1.000 in Comparative Example 3.

Comparative Example 4

Preparation of a Powdery Material Including Tungsten-Doped Lithium Manganese Iron Phosphate-Based Particulates of

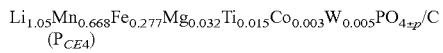
($P_{CE4}$)

Procedures of Comparative Example 4 were similar to those of Example 2 except that titanium dioxide, cobalt(II) hydroxide, tungsten trioxide, and phosphoric acid were used in a molar ratio of Ti:Co:W:P of 0.015:0.003:0.005:1.000 in comparative Example 4.

X-Ray Diffraction (XRD) Analysis

The powdery material of Example 1 was analysed using an X-ray diffractometer. The analysis result is shown in FIG. 1.

As shown in FIG. 1, the tungsten-doped lithium manganese iron phosphate-based particulates contained in the powdery material of Example 1 have an olivine-type crystal structure.

Measurement of Specific Surface Area

The specific surface area of each of the powdery materials of Examples 1 and 2 and Comparative Examples 1 to 4 was measured by a BET (Brunauer-Emmett-Teller) method with nitrogen as an adsorbate. The results are shown in Table 1 below.

TABLE 1

| Powdery materials | Specific surface area (m²/g) |
| --- | --- |
| $P_{E1}$ | 14.2 |
| $P_{CE1}$ | 14.0 |
| $P_{CE2}$ | 14.8 |

TABLE 1-continued

| Powdery materials | Specific surface area (m²/g) |
| --- | --- |
| $P_{E2}$ | 14.4 |
| $P_{CE3}$ | 14.4 |
| $P_{CE4}$ | 14.7 |

As shown in Table 1, the specific surface area of the powdery material of each of Examples 1 and 2 (doped with tungsten) is substantially similar to that of the each of Comparative Examples 1 and 3 (not doped with tungsten). The results indicates that the specific surface area of the powdery material of each of Examples 1 and 2 is not greatly increased after tungsten doping, which suggests that the powdery material of each of Examples 1 and 2 has a better resistance to moisture absorption and can be further processed more conveniently in a process for manufacturing a lithium-ion battery. Moreover, due to the small specific surface area, undesired reaction between the powdery material and an electrolyte solution could be alleviated.

Application Example 1

The powdery material of Example 1, carbon black, and polyvinylidene fluoride were blended at a weight ratio of 94.5:3:2.5 to obtain a blend. The blend was mixed with N-methyl-2-pyrrolidone (as a solvent) to obtain a paste, which was applied using a doctor blade onto an aluminum foil having a thickness of 22 µm, followed by baking in vacuum at 140° C. to remove N-methyl-2-pyrrolidone, thereby obtaining a cathode material. The cathode material was pressed using a roller to a thickness of 80 µm and cut into a circular cathode with a diameter of 12 mm.

A lithium foil having a diameter of 15 mm and a thickness of 0.2 mm was used as an anode.

Lithium hexafluorophosphate (LiPF$_6$, 1M) was dissolved in a solvent system composed of ethylene carbonate, ethyl methyl carbonate, and dimethyl carbonate in a volume ratio of 1:1:1 to obtain an electrolyte solution.

A polypropylene membrane (purchased from Asahi Kasei Corp., a thickness of 25 µm) was cut into a circular separator with a diameter of 18 mm. The circular separator was immersed into the electrolyte solution and then removed therefrom to obtain an immersed separator.

The cathode, the anode, and the immersed separator thus prepared were used along with other components to manufacture a CR2032 coin-type lithium-ion battery.

Application Example 2

The procedures Application Example 2 were similar to those of Application Example 1 except that the powdery material of Example 2 was used to make a circular cathode in Application Example 2.

Comparative Application Examples 1 to 4

The procedures of each of Comparative Application Examples 1 to 4 were similar to those of Application Example 1 except that the powdery materials of Comparative Examples 1 to 4 were respectively used to make circular cathodes in Comparative Application Examples 1 to 4.

Charge/Discharge Capacity Measurement

Figure 2:
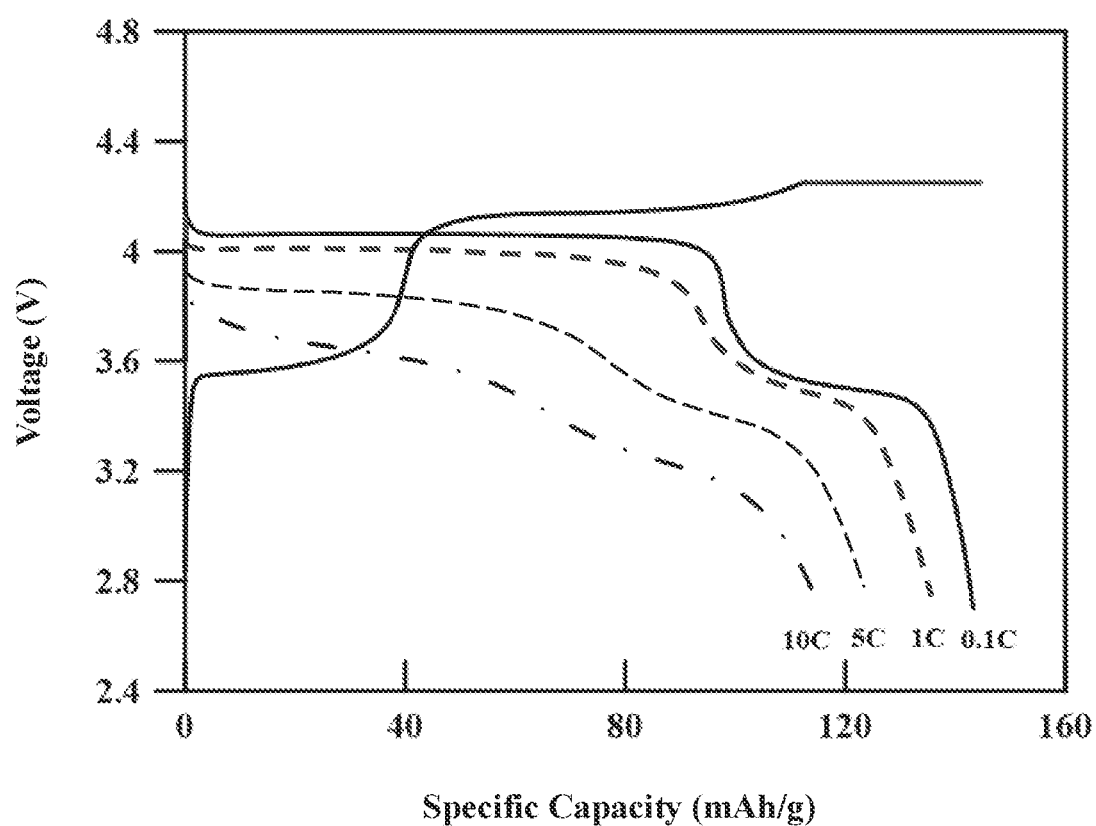
FIG. 2 is a graph illustrating charge/discharge specific capacity-voltage relationship of lithium-ion battery of Application Example 3.
Figure 3:
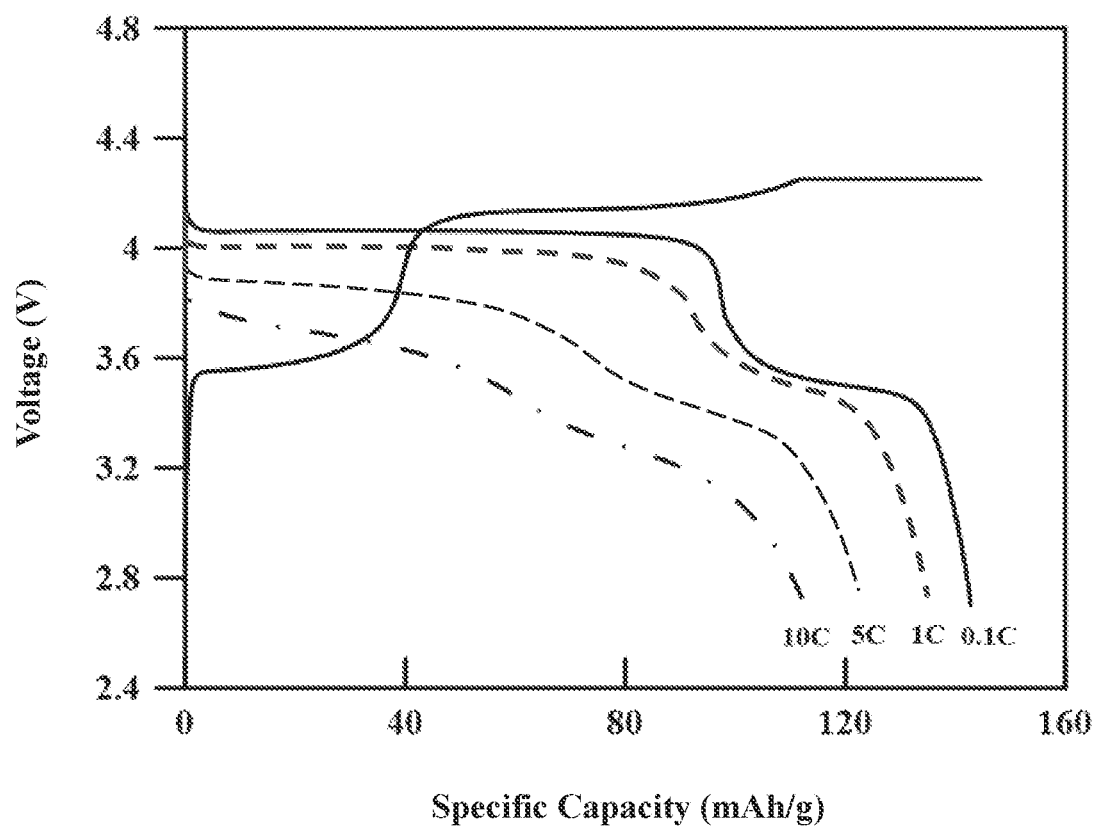
FIG. 3 is a graph illustrating charge/discharge specific capacity-voltage relationship or lithium-ion battery of Comparative Application Example 1.

Charge/discharge specific capacity of each of the lithium-ion batteries of Application Examples 1 and 2 and Comparative Application Examples 1 to 4 were measured at 25° C. using a battery test device (commercially available from MACCOR, USA) at current densities of 1 C/0.1 C, 1 C/1 C, 1 C/5 C, and 1 C/10 C and at a voltage ranging from 2.7 V to 4.25 V. The results are shown in Table 2. The results of Application Example 1 and Comparative Example 1 are shown in FIG. 2 and FIG. 3, respectively.

TABLE 2

| Powdery materials | Discharge specific capacity (mAh/g) at different current densities | | | |
|---|---|---|---|---|
| | 0.1 C | 1 C | 5 C | 10 C |
| $P_{E1}$ | 143.2 | 136.1 | 124.6 | 115.4 |
| $P_{CE1}$ | 142.8 | 135.4 | 123.3 | 112.7 |
| $P_{CE2}$ | 140.5 | 133.5 | 121.9 | 113.1 |
| $P_{E2}$ | 142.7 | 136.2 | 124.2 | 115.1 |
| $P_{CE3}$ | 142.0 | 134.4 | 123.2 | 113.0 |
| $P_{CE4}$ | 141.6 | 134.5 | 123.8 | 114.6 |

As shown in Table 2, the lithium-ion battery of Application Example 1 exhibits a larger discharge specific capacity than each of the lithium-ion batteries of Comparative Application Examples 1 and 2. Similarly, the lithium-ion battery of Application Example 2 exhibits a larger discharge specific capacity than each of the lithium-ion batteries of Comparative Application Examples 3 and 4. This indicates that, with the powdery material according to the disclosure, the lithium-ion battery according to the disclosure is conferred with an improved electrochemical efficiency in its discharge performance.

Charging Efficiency Measurement

Figure 4:
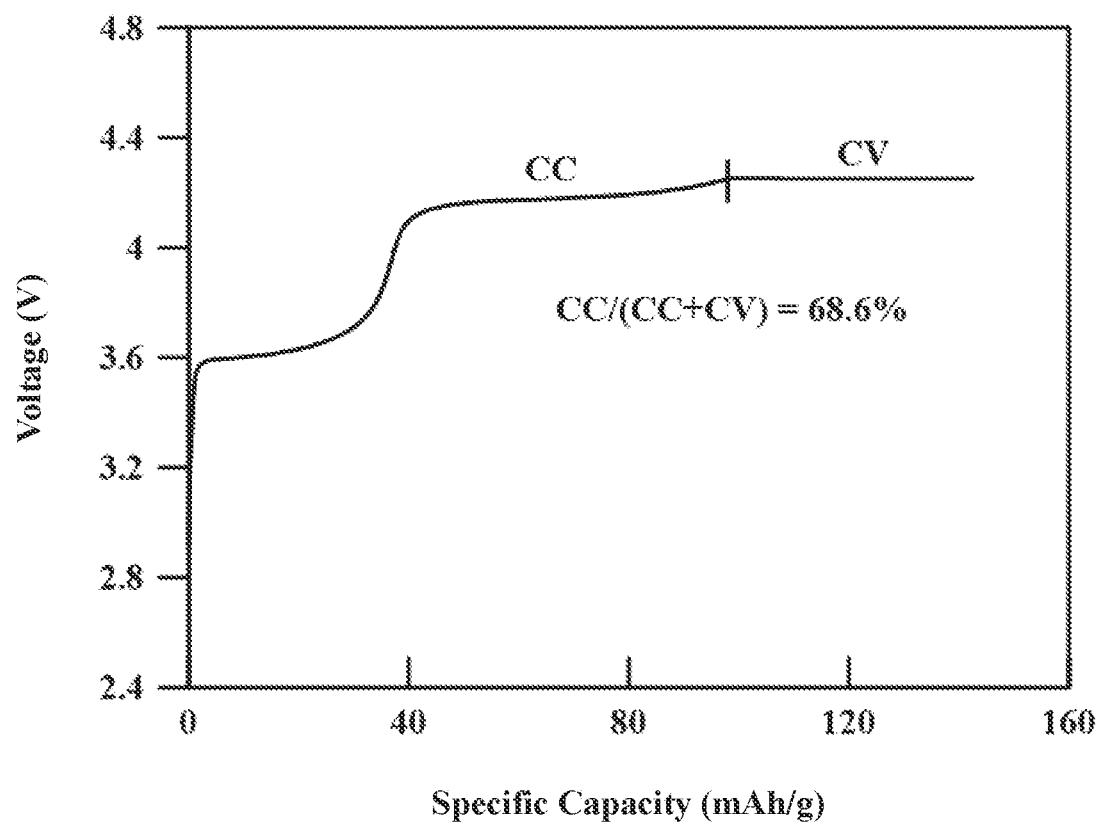
FIG. 4 is a graph illustrating charge specific capacity-voltage relationship of the lithium-ion battery of Application Example 1 at a current density of 2 C.
Figure 5:
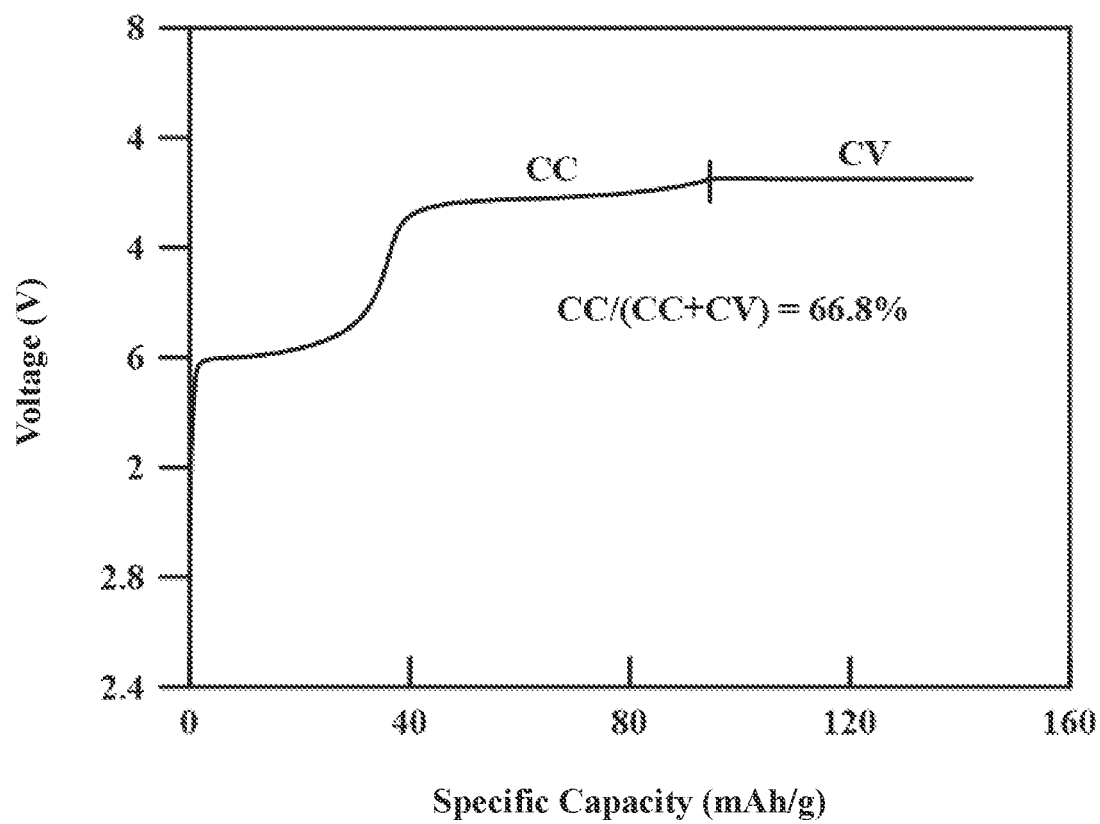
FIG. 5 is a graph illustrating charge specific capacity-voltage relationship of the lithium-ion battery of Comparative Application Example 1 at a current density of 2 C.

Each of the lithium-ion batteries of Application Examples 1 and 2 and Comparative Application Examples 1 to 4 was charged at 25° C. using a battery test device (commercially available from MACCOR, USA) at a current density of 2 C and at a voltage ranging from 2.7 V to 4.25 V. For each of the lithium-ion batteries, a charge specific capacity at constant current (CC), a charge specific capacity at constant voltage (CV) and a total charge specific capacity (CC+CV) were obtained. A ratio of CC/(CC+CV) may be used to evaluate charging efficiency of a battery, and a higher ratio of CC/(CC+CV) indicates that the battery has a higher charging efficiency. The ratios are shown in Table 3. The results of Application Example 1 and Comparative Application Example 1 are shown in FIG. 4 and FIG. 5, respectively.

TABLE 3

| Powdery materials | CC/(CC + CV) (%), 2 C |
|---|---|
| $P_{E1}$ | 68.6 |
| $P_{CE1}$ | 66.8 |
| $P_{CE2}$ | 66.1 |
| $P_{E2}$ | 69.1 |
| $P_{CE3}$ | 66.7 |
| $P_{CE4}$ | 67.9 |

From the results shown in Table 3, the ratio of CC/(CC+CV) of the lithium-ion battery of Application Example 1 is higher than those of the Comparative Application Examples 1 and 2. Similarly, the ratio of CC/(CC+CV) of the lithium-ion battery of Application Example 2 higher than those of the Comparative Application Examples 3 and 4. This indicates that the lithium-ion battery made from the powdery material according to the disclosure has improved charging efficiency.

In view of the aforesaid, the powdery material including the tungsten-doped lithium manganese iron phosphate-based particulates of the disclosure has a relatively small specific surface area. The lithium-ion battery manufactured using the powdery material has a relatively large discharge specific capacity, a relatively high electrochemical efficiency in discharge performance and a relatively high charging efficiency.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A tungsten-doped lithium manganese iron phosphate-based particulate for a cathode of a lithium-ion battery, comprising a composition represented by the following formula:

$$Li_xMn_{0.998-y-z}Fe_yM_zW_{0.002}P_aO_{4a\pm p}/C,$$

wherein
M is a metal combination that includes Mg and Ti;
P $0.9 \leq x \leq 1.2$;
$0.1 \leq y \leq 0.4$;
$0 \leq z \leq 0.08$;
$0.1 \leq y+z \leq 0.48$;
$0.85 \leq a \leq 1.15$;
$0 < p < 0.1$; and
C is in an amount of larger than 0 wt % and up to 3.0 wt % based on a total weight of the composition.

2. The tungsten-doped lithium manganese iron phosphate-based particulate according to claim 1, wherein said metal combination of M further includes Co.

3. A tungsten-doped lithium manganese iron phosphate-based powdery material for a cathode of a lithium-ion battery, comprising the tungsten-doped lithium manganese iron phosphate-based particulate according to claim 1.

4. The tungsten-doped lithium manganese iron phosphate-based powdery material according to claim 3, having a specific surface area ranging from 0.5 m²/g to 20 m²/g.

* * * * *